Nov. 15, 1927.

M. B. DAVIS 1,649,451

PIPE ELEVATING CLAMP

Filed April 30, 1926 5 Sheets-Sheet 1

INVENTOR
Marvin B. Davis
BY
ATTORNEY

Nov. 15, 1927.

M. B. DAVIS 1,649,451

PIPE ELEVATING CLAMP

Filed April 30, 1926     5 Sheets-Sheet 2

INVENTOR
Marvin B. Davis
BY
ATTORNEY

Nov. 15, 1927.
M. B. DAVIS
1,649,451
PIPE ELEVATING CLAMP
Filed April 30, 1926      5 Sheets-Sheet 3
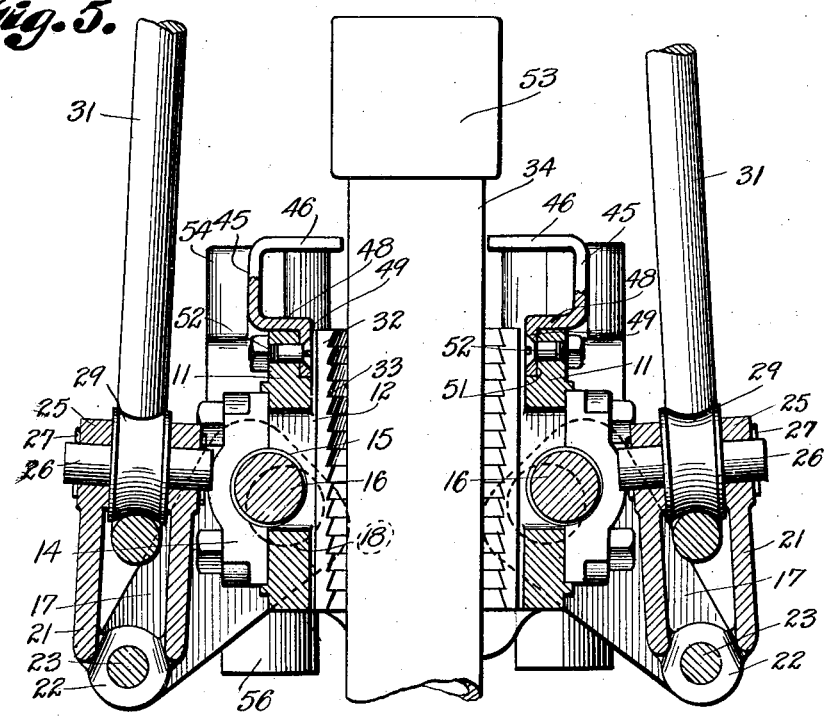
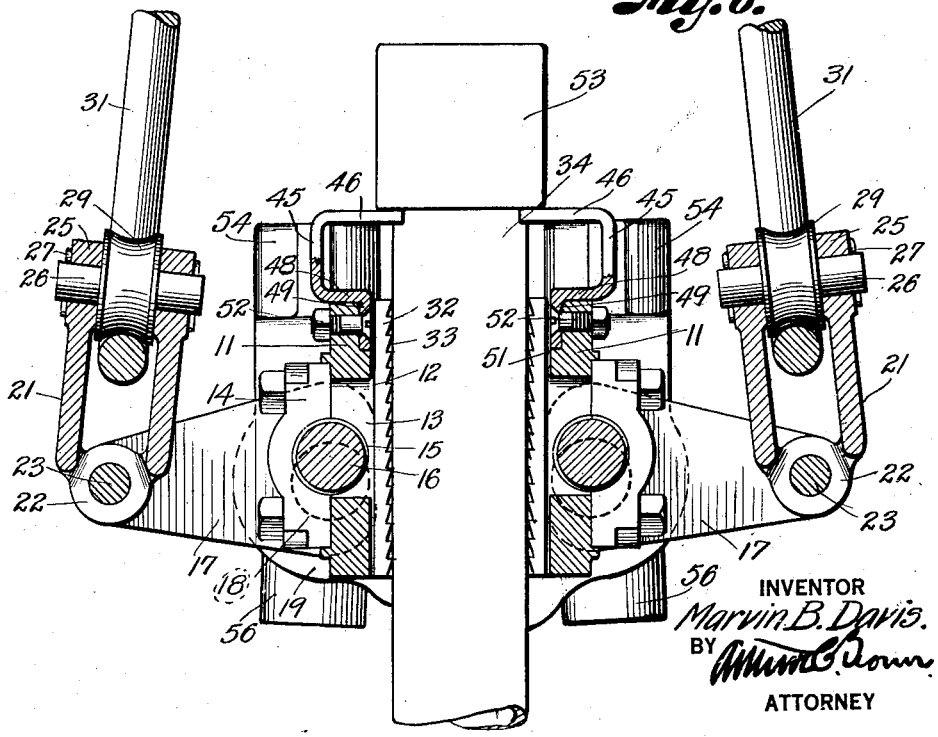
INVENTOR
Marvin B. Davis.
BY
ATTORNEY Nov. 15, 1927.

M. B. DAVIS 1,649,451

PIPE ELEVATING CLAMP

Filed April 30, 1926 5 Sheets-Sheet 4

INVENTOR
Marvin B. Davis.
BY
ATTORNEY

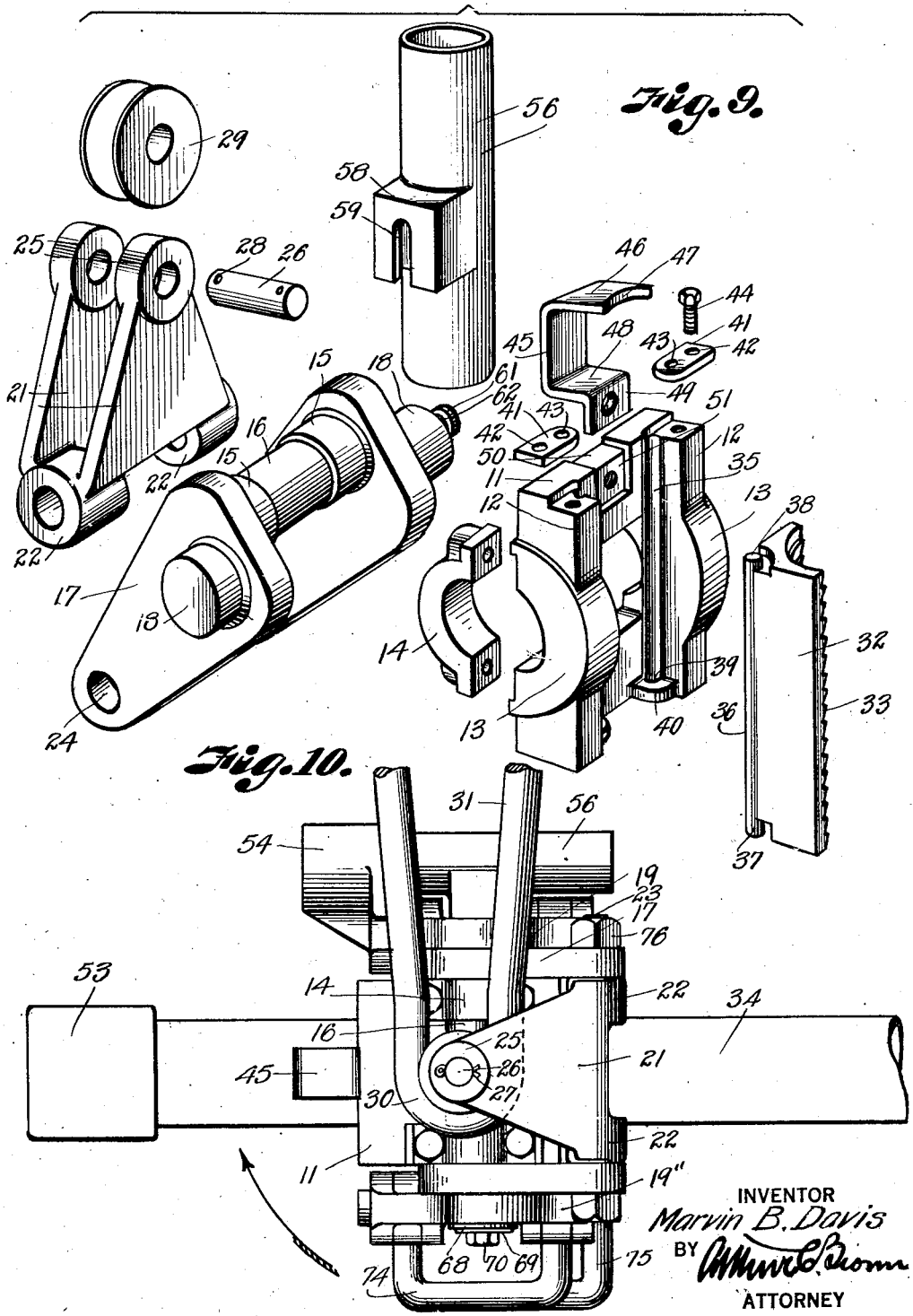

Patented Nov. 15, 1927.

1,649,451

UNITED STATES PATENT OFFICE.

MARVIN B. DAVIS, OF KANSAS CITY, MISSOURI, ASSIGNOR TO GEORGE KRELL, OF SAPULPA, OKLAHOMA.

PIPE-ELEVATING CLAMP.

Application filed April 30, 1926. Serial No. 105,738.

My invention relates to pipe clamps and more particularly to a pipe clamp such as is used in pipe elevators.

It is a purpose of my invention to provide a pipe elevating clamp having a body portion made up of a pair of jaws that are connected pivotally with each other by means of connecting members pivoted to the jaws, the connecting members each comprising a pair of members hinged to each other; and to provide a connection between the jaw portion and a pair of bail members supporting the clamp, whereby the body portion can be swung about a horizontal axis to permit of the more easy manipulation of the pipe clamped by the pipe elevator.

More particularly my invention comprises a body portion comprising a pair of jaws having means for holding gripping members in position therein, said jaws being pivotally connected together and carrying bell crank levers to which links are pivoted, which links are pivotally connected with bail members for supporting the device, said bail members being pivoted to the links on axes extending at substantially right angles to the axes of the pivots of the links to the bell crank levers.

It is another purpose of the invention to provide resilient means for holding the jaws of the pipe clamp referred to above apart under normal conditions, so that the same will not grip the pipe until suitable means on the jaws engage with a projection such as a coupling or sleeve on the pipe acting against the tension of the spring to move the jaws toward each other and the gripping members into engagement with the pipe.

The jaws are connected by means that includes a detachable connection whereby the jaw portion of the device may be opened to pass the same around the pipe, and my invention includes new and improved latching means whereby the detachable connection is made between one of the jaw members and one of the connecting members.

It is a further purpose of my invention to provide stop means for limiting the inward movement of the jaws so that the device will not collapse with the jaws too close together.

Furthermore the invention contemplates providing means for taking up wear at the hinge connection between the jaws, to provide new and improved means for holding the gripping members or slips in place in the jaws, and to provide new and improved means for adjusting the strength of the springs that tend to move the jaws away from each other so that just the proper amount of tension is obtained for holding the jaws in such position that the pipe will pass between the same when the jaw portion is out of engagement with a projection on the pipe, such as a sleeve or coupling.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 5 is a section taken at right angles to Fig. 4.

Fig. 6 is a view similar to Fig. 5, showing the device gripping the pipe.

Fig. 9 is a perspective view of one jaw member, the bell crank lever and link connecting the same with the bail member and other parts associated therewith in disassembled condition, and Fig. 10 is a side elevation showing the jaw portion of the clamping member swung to such a position that the pipe carried thereby extends substantially horizontally.

Figure 1:
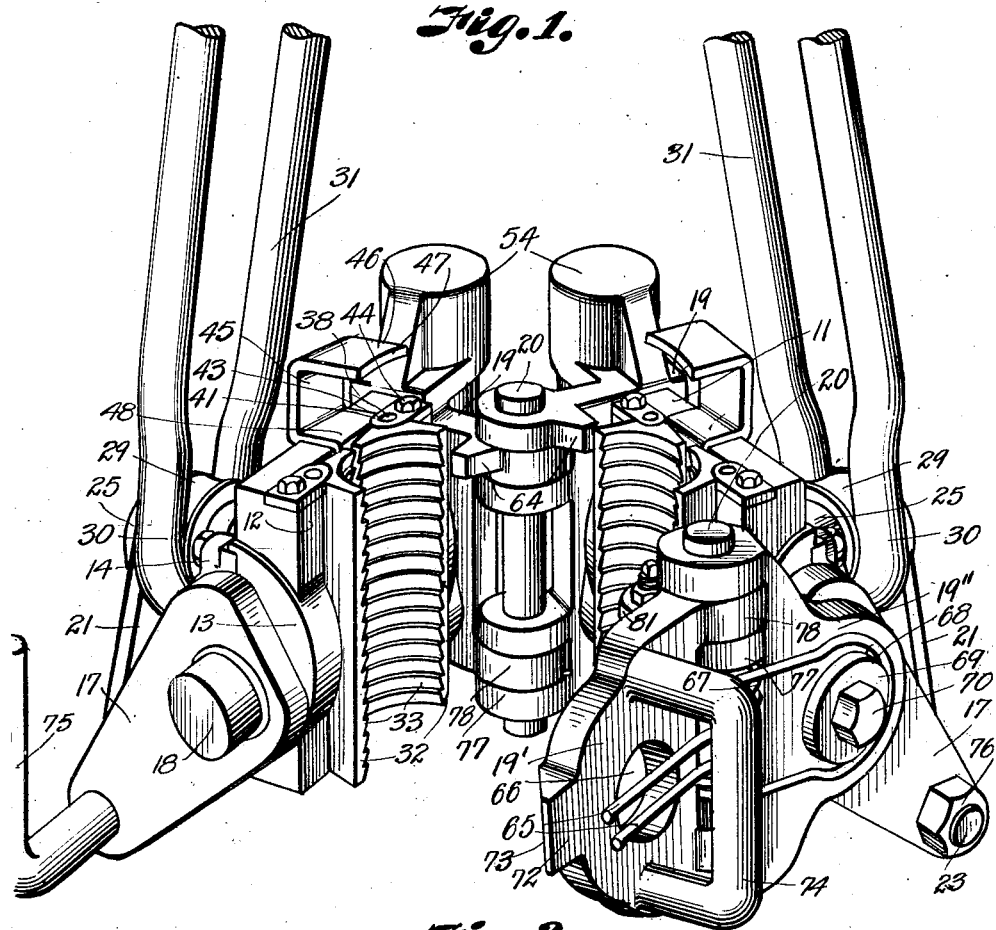
Fig. 1 is a perspective view of my improved pipe elevating clamp, showing the same in open position, the bail members being partly broken away.
Figure 2:
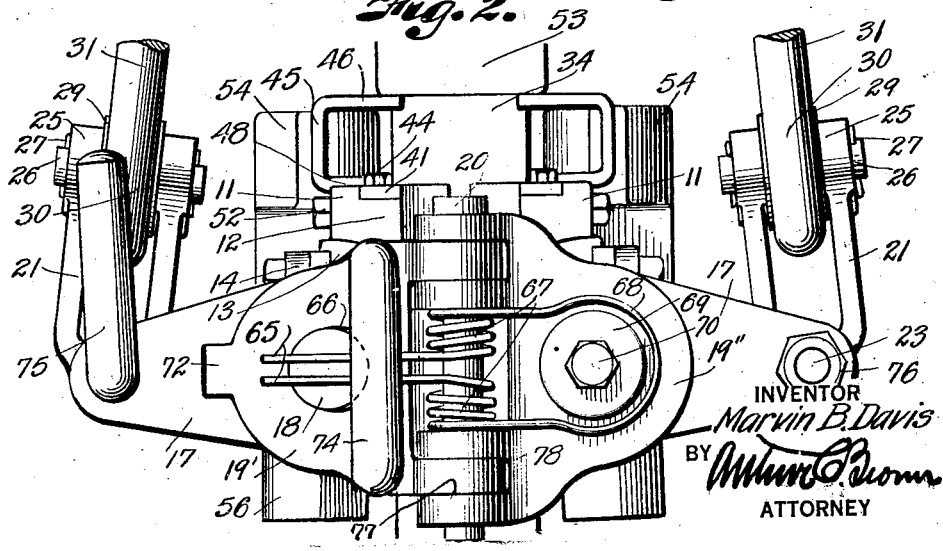
Fig. 2 is a fragmentary side elevation thereof.

Referring in detail to the drawings:

My improved pipe elevating clamp comprises a body portion having the jaw members 11 which are substantially channel shaped as will be evident from Fig. 9, being provided with the flanges 12 along opposite edges thereof. The flanges 12 are provided with outwardly curved central portions 13, each forming substantially one half of a bearing that is completed by the cap member 14, the cap member 14 being secured to the members 11 in any desired manner. Received within the bearings formed by the members 13 and 14 are the enlarged portions 15 of the shafts 16 provided on the bell crank members 17, which bell crank members 17 are provided furthermore with the laterally projecting pivot members 18, upon one pair of which are pivotally mounted the hinge members 19 connected by means of the hinge pin 20 and upon the other pair of which are mounted the hinge members 19′ and 19″ which are connected by means of the hinge pin 20′; the member 19′ being detachably connected with one of the projections 18 in a manner to be described below.

The bell crank levers 17 each have pivotally connected therewith the links 21 which are provided with the pivot ears 22 receiving the pivot pins 23 passing through the openings 24 in the bell crank levers 17. The links 21 are further provided with paired, perforated ears 25 in which the ends of the shaft or pivot pin 26 are mounted, the pins or shafts 26 being held in position on the links 21 by means of the cotter pins 27 passing through the openings 28 in the members 26. A grooved pulley 29 is rotatably mounted on each of the shafts or pins 26 and the bight portions 30 of the bail members 31 are mounted in the grooves of the pulleys 29, said bail members 31 being mounted in the manner usually adopted in devices of this character for elevating casing or tubing in oil well drilling or pumping operations.

Mounted in each of the jaw members is a pair of gripping members or slips 32, each of which is provided with suitable serrations or teeth 33 which grip the pipe around which the jaw members 11 are passed, said pipe being indicated by the numeral 34. The jaw members are each provided with pairs of grooves 35 that are concave and which receive the convex rib portions 36 on the corners of the slips 32 which are angular corresponding to the angular construction of the jaws 11. The ribs 36 terminate in projections 37 and 38 which act at hinge pins, the projection 37 on each of the slips 32 entering an opening 39 in each of the ears 40, there being a pair of ears on each of the jaws 11. The gripping members or slips 32 are held in place by means of the clips 41 having pairs of openings 42 and 43, the openings 42 receiving the securing members 44 for fastening said clips to the jaws 11, and the openings 43 receiving the pivot members 38 on the gripping members 32.

Figure 3:
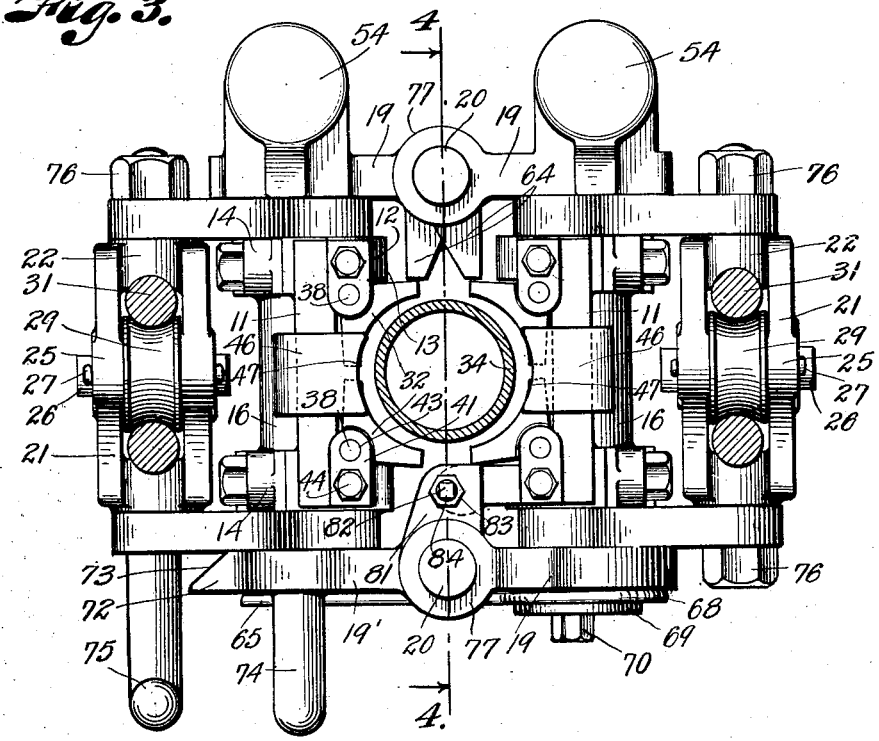
Fig. 3 is a plan view thereof, showing the pipe elevating clamp embracing the pipe, but not in gripping engagement therewith.
Figure 4:
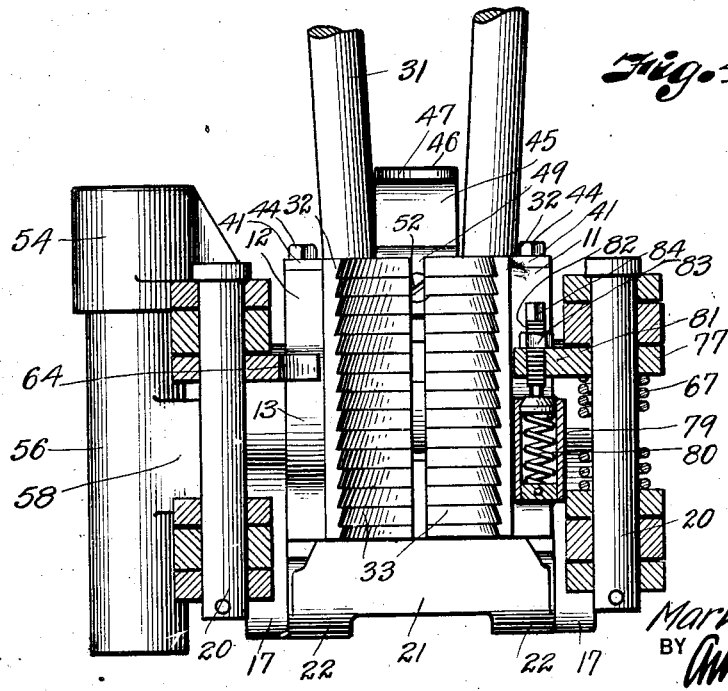
Fig. 4 is a section taken on the line 4—4 of Fig. 3.
Figure 7:
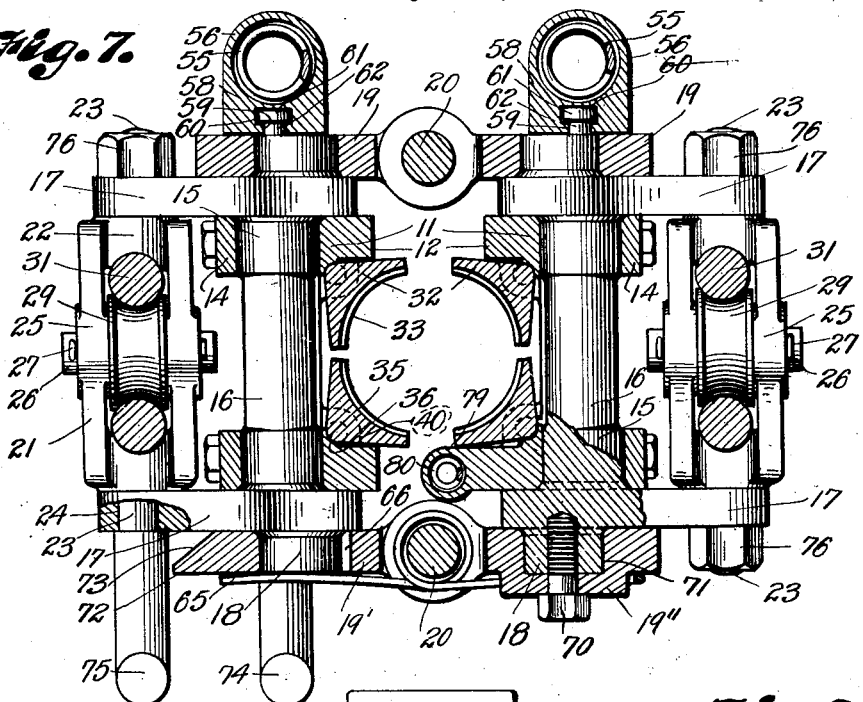
Fig. 7 is a horizontal sectional view of the pipe clamping member.

Each of the jaws 11 is further provided with an angular bracket member 45 having the overhanging portion 46 provided with a curved end face 47 and having the laterally projecting portion 48 and the downwardly projecting portion 49 fitting respectively within the recesses 50 and 51 provided in the jaws 11, said bracket member 45 being held in position by any suitable securing devices such as the bolts 52. The overhanging portions 46 of the bracket members embrace the pipe 34 but are slightly spaced therefrom when the parts are in the position shown in Figs. 3 to 5 inclusive. Said overhanging portions 46, however, are adapted to engage with a projection such as the sleeve or coupling 53 on the pipe 34 as the pipe elevating clamp is moved upwardly along the pipe 34. When such engagement takes place the outer ends of the bell crank levers 17 move upward relative to the inner ends thereof as the upward movement of the jaws is halted by engagement of the overhanging portions 46 of the brackets 45 with the projection 53. The pivots 18 on the opposite jaws being connected by means of the paired members 19, 19′ and 19″, these cannot move outwardly beyond a certain limit and, as a result, the jaw members 11 will move toward each other, the pivots 20 of the hinges connecting the jaw members permitting such inward movement of the jaws and causing the gripping members 32 to engage with the pipe 34 as shown in Fig. 6.

Figure 8:
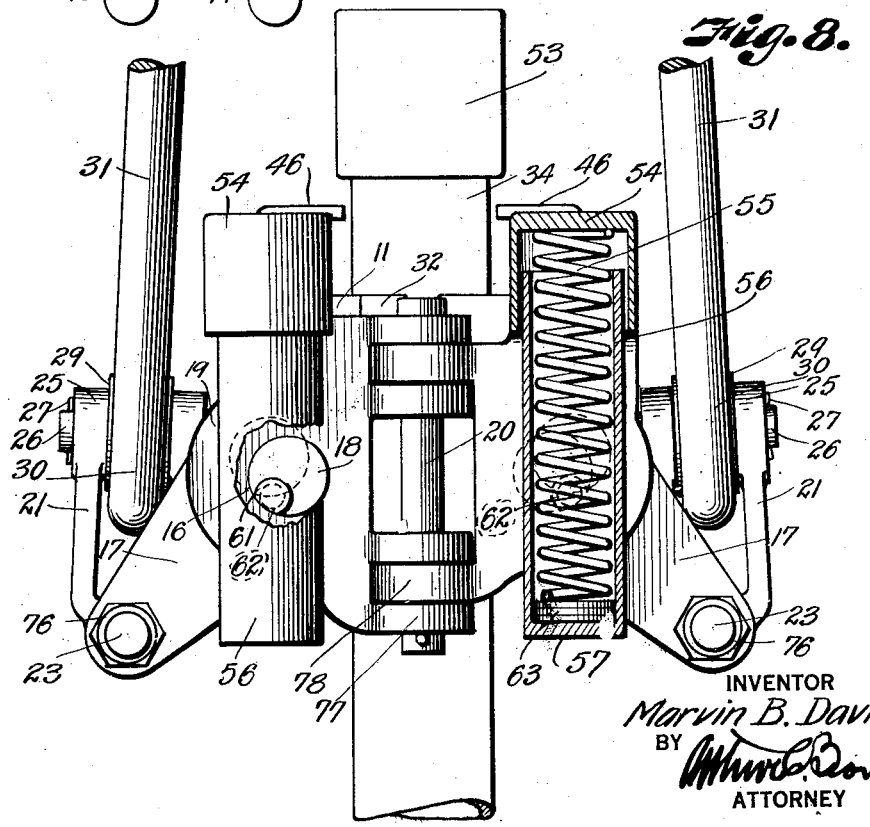
Fig. 8 is a view similar to Fig. 2, but viewed from the opposite side thereof, one of the spring holding members being shown in section.

Each of the hinge members 19 is provided with a laterally projecting, spring holding member 54 which is cup-like in shape and which receives the end of the coil spring 55. Embracing each of the coil springs is a tubular member 56 which has a closed end 57 and which is adapted to telescope within the cup-like member 54. Each of said tubular members 56 is provided with a lateral projection 58 that has an open ended slot 59 therein. The slots 59 lead to passages 60 that are slightly wider than the slots 59 in which the heads 61 of the pins 62 are mounted, the shanks of the pins passing through the slots 59. Said headed pins are mounted eccentrically on adjacent pivot members 18 and the springs 55 are under tension so that the tendency is to rotate the pins on the axes of the members 18 in a counter-clockwise direction, as viewed in Fig. 8, thus tending to hold the jaws 11 apart. The tension of the springs 55 is regulated by any suitable filler members such as the disks 63.

In order to limit the inward movement of the jaws 11 toward each other, the stops 64 are provided on the members 19 which are adapted to engage with the gripping members 32 to thus limit the inward movement of the jaws.

The detachable connection between one of the pivots 18 and the hinge portion 19″ comprises a spring having forked ends 65 passing over the opening 66 in the hinge portion 19″ which opening 66 is adapted to receive the projection 18. The spring 65 furthermore has coiled portions 67 embracing the hinge pin 20′ and a bight portion 68 extending around the enlargement 69 on the hinge portion 19. Said enlargement is further provided with a suitable opening for receiving the screw 70 which engages with the projection 18 seated in the recess 71 in the member 19″ whereby said member 19″ is secured to one of the jaw members 11.

It will be obvious that the spring fingers or forked portions 65 of the spring will tend to hold the member 19′ in engagement with the projection 18 on one of the jaw members 11. In order to bring the member 19′ into engagement with the projection 18, a projection 72 is provided on the member 19′ which has the bevelled face 73 so that as the hinge member 19′ is swung into engagement with the projection 18, the bevelled face 73 will swing the member 19″ outwardly to properly align the projection 18 with the opening 66.

In order to manipulate the device, suitable handles are provided comprising the handle 74 on the hinge member 19′ and the handle 75 formed from one end of one of the pivot pins 23, the other ends of the pivot pins being threaded to receive the nuts 76 whereby the parts are held in assembled relation.

In use there is a tendency for the hinge members to wear, that is, the upper surfaces of the hinge ears 77 and the lower surfaces of the hinge ears 78 gradually wear so that there would be a looseness in the hinges if no means were provided to compensate for this. In order to avoid the effect of such wear which would tend to throw the latch opening 66 out of alignment with the projection 18, a spring holding member 79 within which the compression spring 80 is mounted, is provided on the member 11, while an ear 81 is provided on the member 19″ which receives the set screw 82 that is held adjustably in position by means of the nut 83 and which has a head 84 engaging with the spring 80. As a result the member 19″ is held up due to the pressure exerted by the spring 80, and the opening 66 will always align with the projection 18.

What I claim and desire to secure by Letters Patent is:

1. In a pipe elevator, a pair of jaws hingedly connected together, a pair of bail members, bell crank levers connected with said jaws and links connecting said bell crank levers with said bail members, said bail members being pivoted to said links on an axis transverse to the axis of said bell crank levers.

2. In a pipe elevator, a body portion comprising a pair of jaws, connecting members pivoted to said jaws, said connecting members being pivotally connected with each other on an axis transverse to the pivots connecting said members to said jaws and means limiting the movement of said jaws toward each other.

3. In a pipe elevator a pair of hingedly connected jaws, gripping members carried by said jaws and means for taking up wear in the hinge connection between said jaws.

4. In a pipe elevator a pair of hingedly connected jaws, gripping members carried by said jaws and resilient means for taking up wear in the hinge connection between said jaws.

5. In a pipe elevator, a body portion comprising a pair of jaws, connecting members pivoted to said jaws, said connecting members being pivotally connected with each other on an axis transverse to the pivots connecting said members to said jaws, and resilient means tending to move said jaws away from each other.

6. In a pipe elevator, a body portion comprising a pair of jaws, connecting members pivoted to said jaws, said connecting members being pivotally connected with each other on an axis transverse to the pivots connecting said members to said jaws, resilient means tending to move said jaws away from each other and means engageable by an enlargement on the pipe moving said jaws toward each other against the action of said resilient means.

7. In a pipe elevator, a body portion comprising a pair of jaws, connecting members pivoted to said jaws, said connecting members being pivotally conected with each other on an axis transverse to the pivots connecting said members to said jaws, resilient means tending to move said jaws away from each other and means engageable by an enlargement on the pipe moving said jaws toward each other against the action of said resilient means, said last mentioned means embodying bail members and bell crank members connecting said jaws with said bail members.

8. In a pipe elevator, a body portion comprising a pair of jaws, connecting members between said jaws, each comprising a pair of members hingedly connected together, means pivotally connecting one of said connecting members with each of said jaws, means pivotally connecting the other of said connecting members to one of said jaws, and a detachable pivotal connection between said last mentioned connecting member and the other jaw comprising a projection on said jaw entering an opening in said connecting member and resilient means on said connecting member engaging said projection to hold the same in said opening.

9. In a pipe elevator, a body portion comprising a pair of jaws, connecting members pivoted to said jaws, said connecting members being pivotally connected with each other on an axis transverse to the pivots connecting said members to said jaws, resilient means tending to move said jaws away from each other, and means for adjusting said resilient means.

10. In a pipe elevator, a pair of jaws, means hingedly connected together and pivotally connected with said jaws to connect said jaws with each other, bell crank levers pivoted on said jaws, links pivotally connected with said bell crank levers and bail members pivotally connected with said links, the pivots of said links extending transversely to each other.

11. In a pipe elevator, a pair of jaws, means hingedly connected together and pivotally connected with said jaws to connect said jaws with each other, bell crank levers pivoted on said jaws, links pivotally connected with said bell crank levers and bail members pivotally connected with said links, said last mentioned pivotal connection including anti-friction rollers on said links which said bail members engage, the pivots of said links extending transversely to each other.

12. In a pipe elevator, a pair of jaws, means hingedly connected together and pivotally connected with said jaws to connect said jaws with each other, bell crank levers pivoted on said jaws, links pivotally connected with said bell crank levers, bail members pivotally connected with said links, the pivots of said links extending transversely to each other, eccentrics on said bell crank levers, springs mounted on said jaws and means on said eccentrics engaging said springs, whereby said springs tend to move said jaws apart.

13. In a pipe elevator, a pair of jaws, means hingedly connected together and pivotally connected with said jaws to connect said jaws with each other, bell crank levers pivoted on said jaws, links pivotally connected with said bell crank levers, bail members pivotally connected with said links, the pivots of said links extending transversely to each other, eccentrics on said bell crank levers, springs mounted on said jaws, means on said eccentrics engaging said springs, whereby said springs tend to move said jaws apart, and means on said jaws engageable by a projection on the pipe to move said jaws toward each other into engagement with the pipe against the action of said springs.

14. In a device of the character described, a frame comprising bell crank end members, each including a shaft, front and back members pivotally connected with the bell crank members eccentrically of the shafts, jaw members on the bell crank shafts, and links pivotally suspending the bell crank members on axes parallel with the shafts and jaw mountings, whereby movement of the links relative to the frame will effect a closing movement of the jaw members.

15. In a device of the character described, a frame comprising bell crank end members, front and back members pivotally connected with the bell crank members at their fulcrum points, jaw members on the bell crank members, and links suspending the bell crank members, whereby movement of the links relative to the frame will rock the bell crank members on the front and back member mountings to shift the jaw members.

16. In a device of the character described, a frame comprising bell crank end members, front and back members pivotally connected with the bell crank members at their fulcrum points, jaw members on the bell crank members, links pivotally connected with the bell crank members on axes parallel with the shafts, and hangers pivotally suspending the links on axes transverse to the first named axes, whereby the frame may turn as a unit on the hanger axes and the jaw members are rocked by movement of the links relative to the front and back members.

17. In a device of the character described, a frame comprising bell crank end members, front and back members pivotally connected with the bell crank members at their fulcrum points, jaw members on the bell crank members, links suspending the bell crank members, whereby movement of the links relative to the frame will rock the bell crank members on the front and back member mountings to shift the jaws members, and yielding means normally resisting shifting of the jaw members.

18. In a device of the character described, hingedly connected frame members, comprising means for engaging supporting springs, bell crank levers arranged transversely to the frame members, spring carriers on said levers, springs mounted on said carriers and supporting said engaging means, jaws on said levers, slips on the jaws, and means supporting the levers to effect rocking of the levers against tension of said springs when movement of the jaws with the levers is restrained.

19. In a device of the character described, a pair of bell crank levers, opposed jaws pivotally mounted on said levers, slips on said jaws, a spring carrier associated with each of the levers, a coil spring carried by and projecting from each of said carriers, hingedly connected frame members comprising inverted cups telescoping corresponding spring carriers and yieldingly supporting the frame members on the springs, and suspension means connected with the bell crank levers.

20. In a device of the character described, a pair of jaws having shaft bearings, slips on said jaws, bell crank levers having shafts for mounting the jaws and provided with trunnions, eccentric to the shaft, front and back frame members pivoted on said trunnions, pins extending eccentrically from the rear trunnions on said cranks, spring carriers mounted on said pins, springs carried by said carriers, means hingedly connecting the rear frame members, means on the rear frame members engaging said springs, and suspension means connected with said bell crank levers.

21. In a device of the character described, a pair of jaws having shaft bearings, slips on said jaws, bell crank levers having shafts for mounting the jaws and provided with trunnions eccentric to the shaft, front and back frame members pivoted on said trunnions, headed pins extending eccentrically from the ends of the rear trunnions, tubular spring carriers having side bosses provided with downwardly facing and laterally slotted sockets for receiving said pins, coil springs seated in and projecting above said carriers, inverted cups on said rear frame members telescoping the spring carriers and supporting the frame members on the springs, and suspension means connected with the crank members.

In testimony whereof I affix my signature.

MARVIN B. DAVIS.